United States Patent
Fuller et al.

(10) Patent No.: US 9,868,804 B1
(45) Date of Patent: Jan. 16, 2018

(54) PERFLUOROSULFONIC ACID NANOFIBERS

(71) Applicant: GM GLOBAL TECHNOLOGY OPERATIONS LLC, Detroit, MI (US)

(72) Inventors: Timothy J. Fuller, Pittsford, NY (US); Frank D. Coms, Fairport, NY (US); Cristin L. Keary, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/219,783

(22) Filed: Jul. 26, 2016

(51) Int. Cl.
| | |
|---|---|
| *B29C 67/00* | (2017.01) |
| *H01M 8/10* | (2016.01) |
| *C08F 228/02* | (2006.01) |
| *D01F 6/32* | (2006.01) |
| *H01M 8/0239* | (2016.01) |

(52) U.S. Cl.
CPC .............. *C08F 228/02* (2013.01); *D01F 6/32* (2013.01); *H01M 8/0239* (2013.01)

(58) Field of Classification Search
USPC .......................................... 526/243; 264/105
See application file for complete search history.

(56) References Cited

U.S. PATENT DOCUMENTS

| | | | |
|---|---|---|---|
| 8,833,434 B2 | 9/2014 | Mitchell et al. | |
| 9,163,337 B2 | 10/2015 | Mitchell et al. | |
| 2010/0196802 A1* | 8/2010 | Tabata | B22F 1/025 429/524 |
| 2010/0227247 A1* | 9/2010 | Pintauro | H01M 8/1023 429/479 |
| 2012/0102725 A1 | 5/2012 | Fuller et al. | |
| 2013/0320583 A1* | 12/2013 | Mitchell | H01M 8/0243 264/105 |
| 2013/0330653 A1 | 12/2013 | Mitchell et al. | |
| 2013/0330655 A1 | 12/2013 | Mitchell et al. | |
| 2014/0045094 A1 | 2/2014 | Mitchell et al. | |
| 2016/0164129 A1* | 6/2016 | Amemiya | H01M 8/1004 429/481 |

* cited by examiner

*Primary Examiner* — Mark Kaucher
*Assistant Examiner* — Henry Hu
(74) *Attorney, Agent, or Firm* — Brooks Kushman P.C.

(57) ABSTRACT

A method for making a device with a fibrous sheet includes a step of combining a fiber-forming resin with a carrier resin to form a resinous mixture. The fiber forming resin has a fluorinated backbone with a pendent $CF_2CF_2$—X group where X is a $SO_3H$ or $SO_2F$. The carrier resin is a soluble polyamide. The resinous mixture is extruded to form an extruded resinous mixture. The extruded resinous mixture has fiber strands of the fiber-forming resin within the carrier resin. The extruded resinous mixture is contacted with water to separate the fiber strands of the fiber-forming resin from the carrier resin. Fiber forming strands are optionally cross-linked with ammonia and then are hydrolyzed to form ionomers.

10 Claims, 7 Drawing Sheets

_US 9,868,804 B1_

PERFLUOROSULFONIC ACID NANOFIBERS

TECHNICAL FIELD

In at least one aspect, the present invention relates to sulfonated polymeric fibers that can be used in fuel cell applications.

BACKGROUND

Perfluorosulfonic acid polymeric (PFSA) ionomers and nanofibers are useful in fuel cells, humidifiers, electrolyzers, electrodes, ion exchange applications, battery separators, and filters. PFSA nanofibers have been made by electrospinning (U.S. Pat. No. 9,172,099).

In proton exchange membrane ("PEM") type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid ("PFSA") ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer ("PFSA"). For example, PFSA is typically added to the Pt/C catalyst ink in electrode layer fabrication of proton exchange membrane fuel cells to provide proton conduction, to the dispersed Pt-carbon catalyst nanoparticles, as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

Accordingly, the present invention provides improved methods of making porous pads that are useful in fuel cell applications.

SUMMARY

The present invention solves one or more problems of the prior art by providing in at least one embodiment, a method for making sulfonated fibers for fuel cell applications. The method includes a step of combining a fiber-forming resin with a carrier resin to form a resinous mixture. The carrier resin is water soluble and the fiber-forming resin is described by formulae I, II, or III:

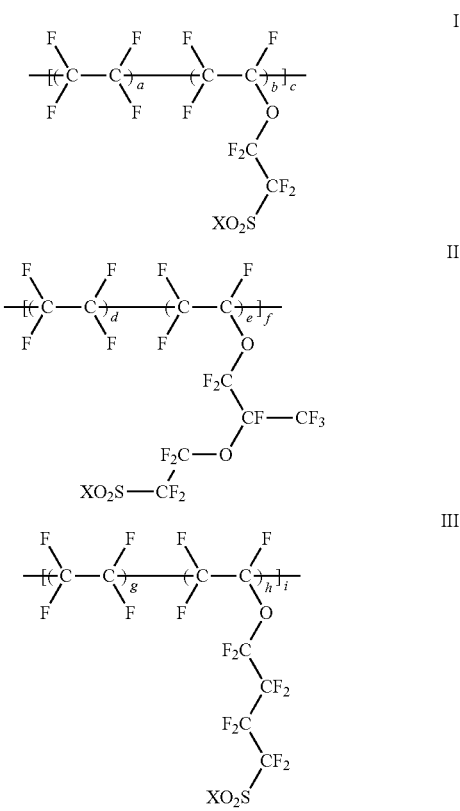

wherein:
a is about 5 or 6;
b is 1;
c is on average from about 30 to 150;
d is about 5;
e is 1;
f is on average from about 30 to 150;
g is about 5;
h is 1;
i is on average from about 30 to 150; and
X is OH or F.

The resinous mixture is extruded to form an extruded resinous mixture in which the extruded resinous mixture has fiber strands of the fiber-forming resin within the carrier resin. The extruded resinous mixture is contacted with water to separate the fiber strands of the fiber-forming resin from the carrier resin.

In another embodiment, a method for making sulfonated fibers for fuel cell applications is provided. The method includes a step of combining a fiber-forming resin with a carrier resin to form a resinous mixture. Characteristically, the carrier resin is water soluble and the fiber-forming resin is described by formulae I, II, or III:

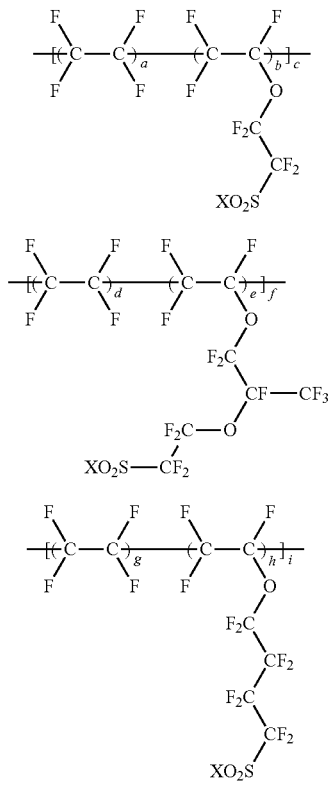

wherein:
a is about 5 or 6;
b is 1;
c is on average from about 30 to 150;
d is about 5;
e is 1;
f is on average from about 30 to 150;
g is about 5;
h is 1;
i is on average from about 30 to 150; and
X is OH or F. The resinous mixture is extruded to form an extruded resinous mixture. The extruded resinous mixture has fiber strands of the fiber-forming resin within the carrier resin. The extruded resinous mixture is contacted with ammonia to form an ammonia-treated fiber-formed resin. The ammonia-treated fiber-formed resin is contacted with water to separate the fiber strands of the fiber-forming resin from the carrier resin to form a sulfonimide crosslinked perfluorosulfonic acid polymer in which at least a portion of the $SO_2F$ being hydrolyzed to $SO_3H$.

BRIEF DESCRIPTION OF THE DRAWINGS

Exemplary embodiments of the present invention will become more fully understood from the detailed description and the accompanying drawings, wherein.

DETAILED DESCRIPTION

Figure 1:
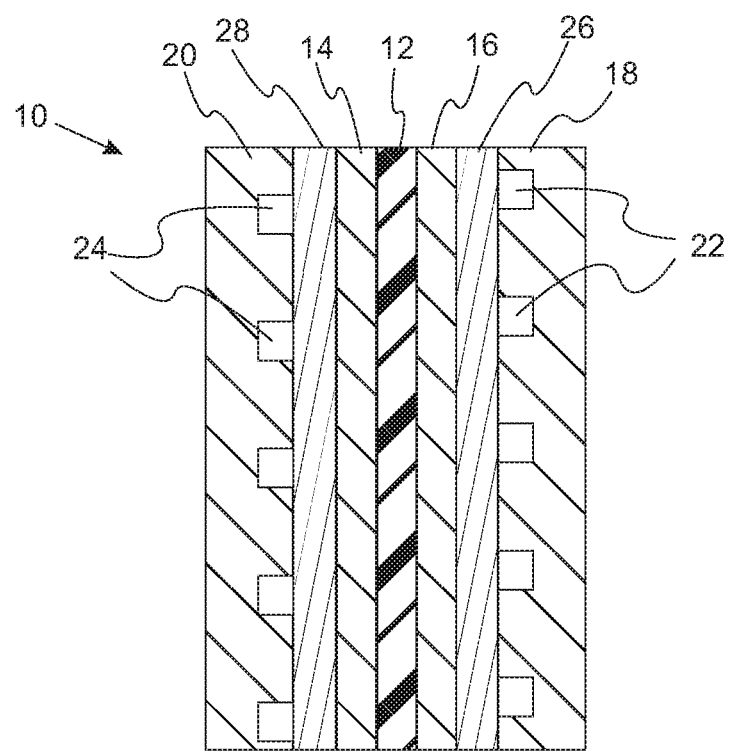
FIG. 1 provides a schematic illustration of a fuel cell incorporating a coated flow field plate.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

In an embodiment, a method for making sulfonated fibers for fuel cell applications is provided. The method includes a step of combining a fiber-forming resin with a carrier resin to form a resinous mixture. The carrier resin has a fluorinated backbone with a pendent $CF_2CF_2$—X group where X is a $SO_3H$ or $SO_2F$. The resinous mixture is extruded to form an extruded resinous mixture. The extruded resinous mixture has fiber strands of the fiber-forming resin within the carrier resin. The extruded resinous mixture is contacted with water to separate the fiber strands of the fiber-forming resin from the carrier resin.

With reference to FIG. 1, a schematic cross section of a fuel cell that incorporates an embodiment of a fibrous sheet is provided. Proton exchange membrane (PEM) fuel cell 10 includes polymeric ion conducting membrane 12 disposed between cathode catalyst layer 14 and anode catalyst layer 16. Advantageously, the membrane 12 and/or the electrode catalyst layers 14 and 16 include ionomer fibers made by a variation of the processes set forth below. Fuel cell 10 also includes flow field electrically conductive plates 18, 20, gas channels 22 and 24, and gas diffusion layers 26 and 28. Diffusion layers 26 and 28 are typically electrically conductive, porous, carbon fiber papers. During operation of the fuel cell 10, a fuel such as hydrogen is feed to the flow field plate 18 on the anode side and an oxidant such as oxygen is feed to the flow field plate 20 on the cathode side. Hydrogen ions are generated by anode catalyst layer 16 migrate through polymeric ion conducting membrane 12 where they react at cathode catalyst layer 14 to form water. This electrochemical process generates an electric current through a load connect to flow field plates 18 and 20.

Figure 2:
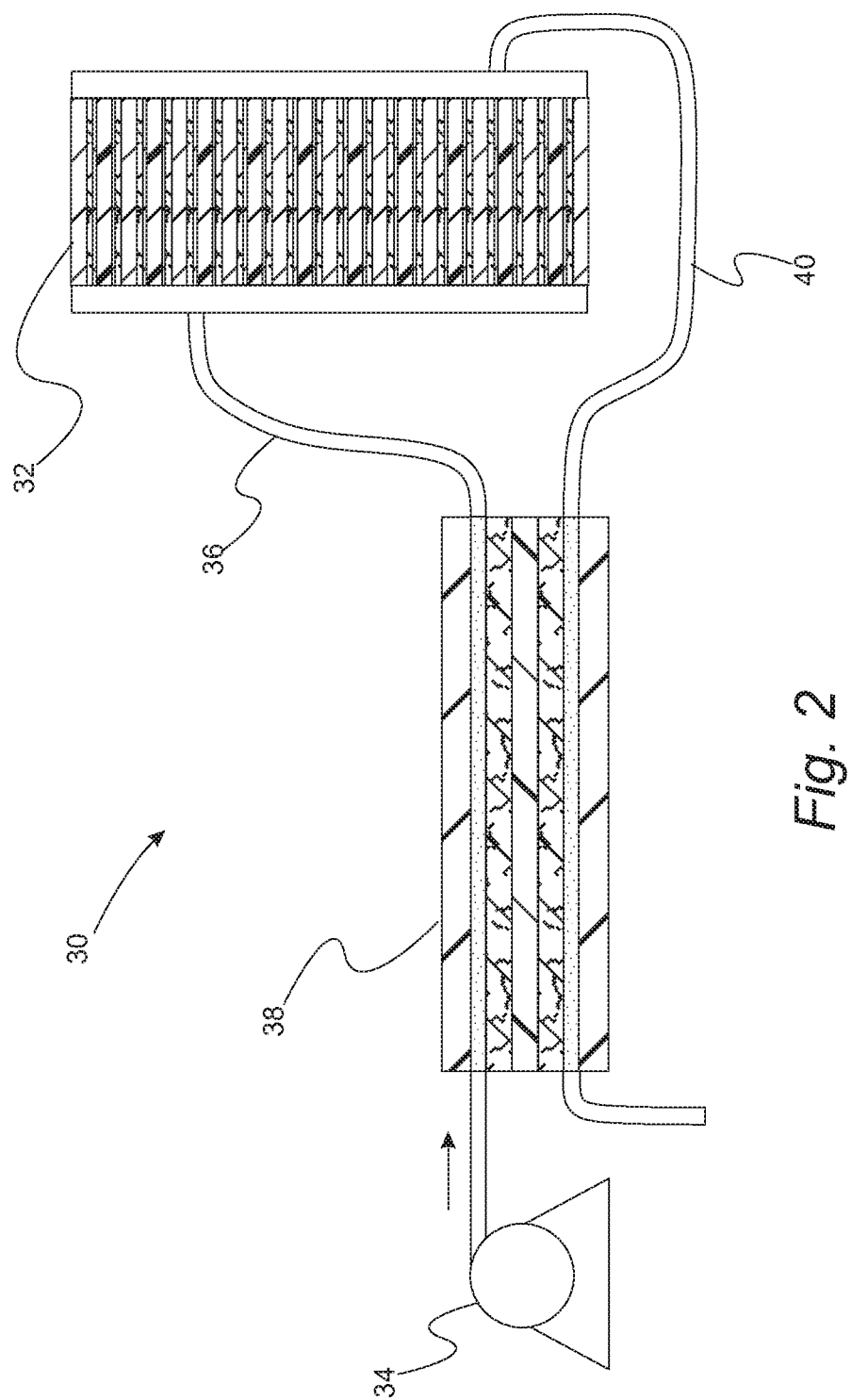
FIG. 2 is a schematic of a fuel cell system including a membrane humidifier assembly for humidifying a cathode inlet airflow to a fuel cell stack.

With reference to FIG. 2, a schematic of a fuel cell system incorporating a membrane humidifier assembly is provided. Fuel cell system 30 includes fuel cell stack 32. Compressor 34 provides a flow of air to the cathode side of the stack 32 on a cathode input line 36. The flow of air from the compressor 34 is sent through membrane humidifier assembly 38 to be humidified. A cathode exhaust gas is output from the stack 32 on a cathode output line 40. The cathode exhaust gas includes a considerable amount of water vapor and/or liquid water as a by-product of the electrochemical process in the fuel cell stack 32. As is well understood in the art, the cathode exhaust gas can be sent to membrane humidifier assembly 38 to provide the humidification for the cathode inlet air on the line 36.

Figure 3:
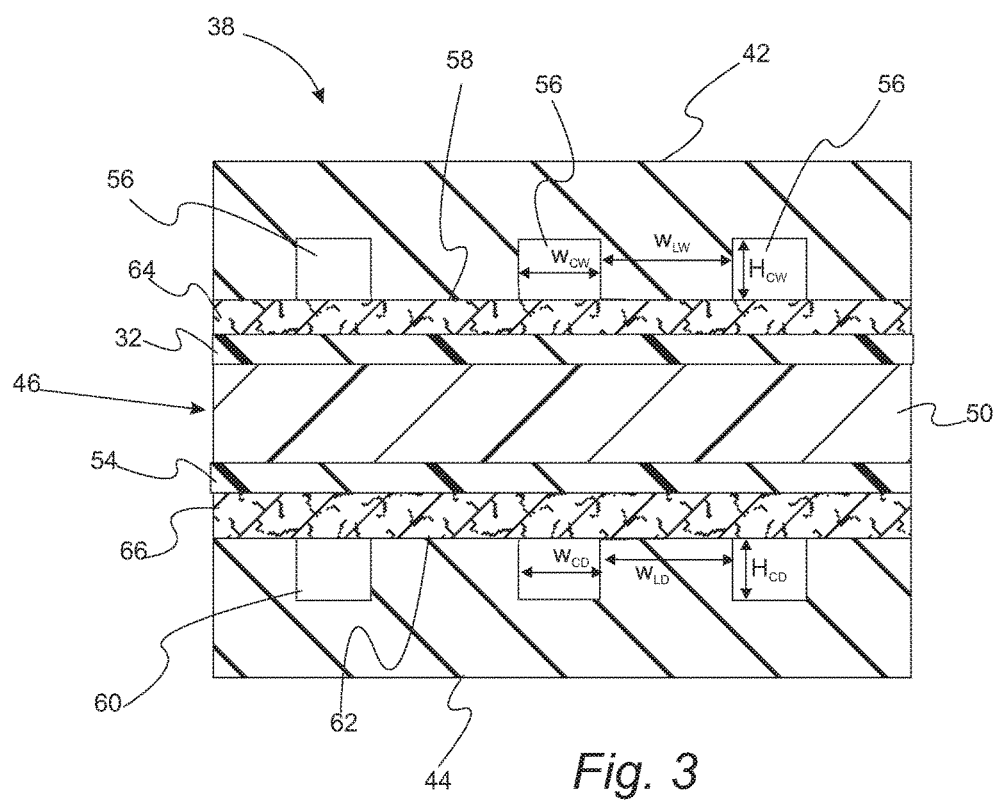
FIG. 3 is a schematic cross section of a membrane humidifier assembly perpendicular to the flow of gas to a first flow field plate.

With reference to FIG. 3, a schematic cross section of a membrane humidifier assembly is provided. The membrane humidifier of this embodiment may be used in any application in which it is desirable to transfer water from a wet gas (e.g., air) to a dry gas (e.g., air) such as the fuel cell system of FIG. 2. Membrane humidifier assembly 38 includes first flow field plate 42 adapted to facilitate flow of a first gas to membrane humidifier assembly 38. Membrane humidifier assembly 38 also includes second flow field plate 44 adapted to facilitate flow of a second gas to membrane humidifier assembly 38. In a refinement, first flow field plate 42 is a wet plate and second flow field plate 44 is a dry plate. Polymeric membrane 46 is disposed between the first flow field plate 42 and second flow field plate 44. In one variation, polymeric membrane 46 includes the sulfonated fibers, and in particular a mat of the sulfonated fibers (i.e., the fibrous pad) set forth herein. In a refinement, a mat of the sulfonated fibers has a thickness from about 5 to 50 microns. In a further refinement, a mat of the sulfonated fibers has a thickness from about 0.5 to 10 microns.

First flow field plate 42 includes a plurality of flow channels 56 formed therein. The channels 56 are adapted to convey a wet gas from the cathode of the fuel cell to an exhaust (not shown). In a refinement of the present embodiment, channels 56 are characterized by a width $W_{CW}$ and a depth $H_{CW}$. A land 58 is formed between adjacent channels 56 in flow field plate 42. The land 58 includes a width $W_{LW}$. It should be appreciated that any conventional material can be used to form the first flow field plate 42. Examples of useful materials include, but are not limited to, steel, polymers, and composite materials, for example. Second flow field plate 44 includes a plurality of flow channels 60 formed therein. The channels 60 are adapted to convey a dry gas from a source of gas (not shown) to the cathode of the fuel cell. As used herein, wet gas means a gas such as air and gas mixtures of $O_2$, $N_2$, $H_2O$, $H_2$, and combinations thereof, for example, that includes water vapor and/or liquid water therein at a level above that of the dry gas. Dry gas means a gas such as air and gas mixtures of $O_2$, $N_2$, $H_2O$, and $H_2$, and combinations thereof, for example, absent water vapor or including water vapor and/or liquid water therein at a level below that of the wet gas. It is understood that other gases or mixtures of gases can be used as desired. Channels 60 include a width $W_{CD}$ and a depth $H_{CD}$. A land 62 is formed between adjacent channels 60 in second flow field plate 44. The land 62 includes a width $W_{LD}$. It should be appreciated that any conventional material can be used to form the field plate 44 such as steel, polymers, and composite materials, for example.

Figure 4:
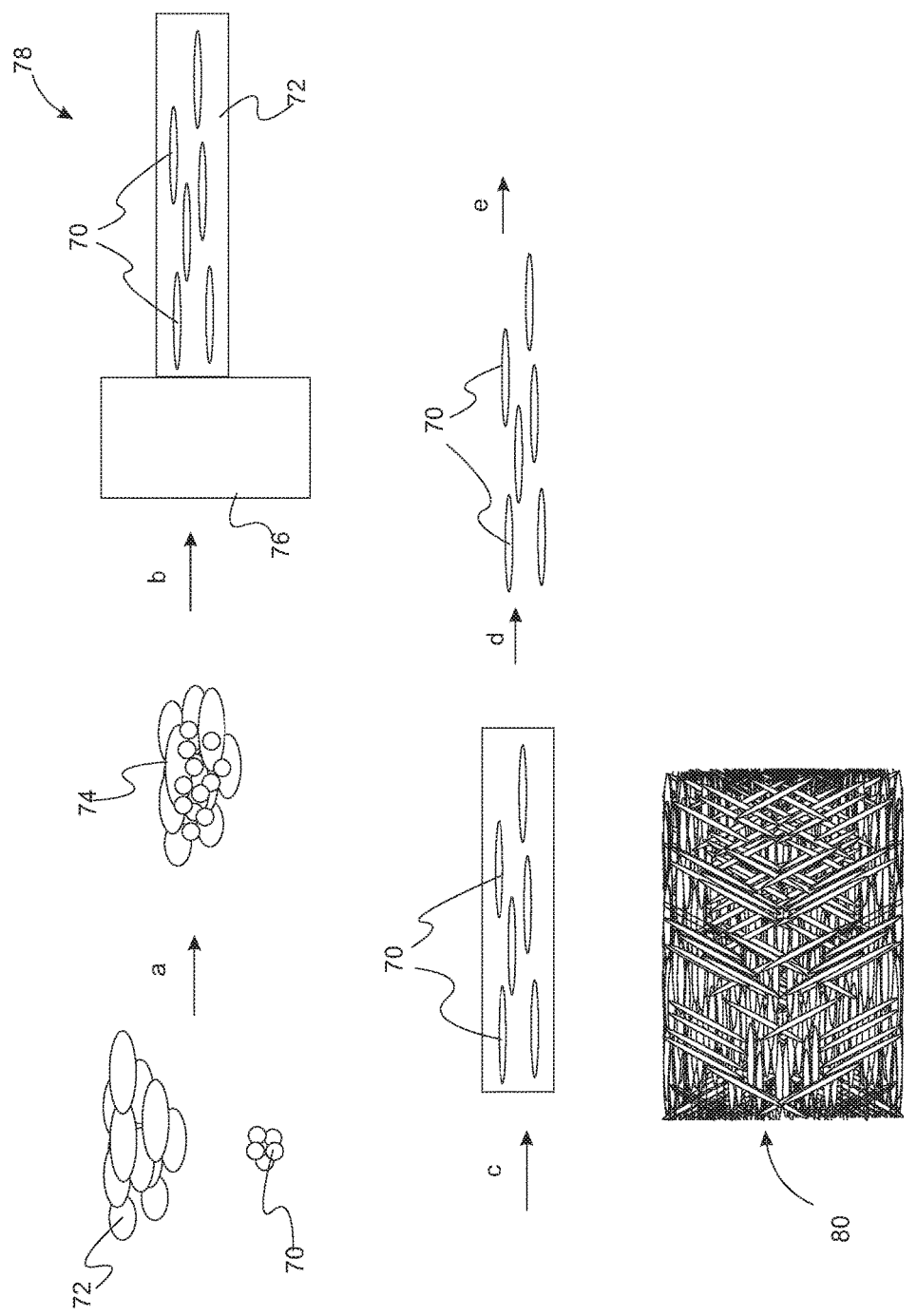
FIG. 4 is a schematic flow chart showing a method of making sulfonated thermoplastic polymer fibers.

With reference to FIG. 4, a method for making sulfonated fibers for fuel cell applications is provided. In step a), a fiber-forming resin 70 is combined with a water soluble carrier resin 72 to form a resinous mixture 74. In a variation, the carrier resin is a water soluble polyamide such as poly(2-ethyl-2-oxazoline) or poly(phenyl-2-oxazoline). In a refinement, the carrier resin has a weight average molecular weight from about 4,000 to 6000 Daltons. In a further refinement, the carrier resin has a weight average molecular weight from 5,000 or 50,000 or 200,000 or 500,000 Daltons. In a refinement, the weight ratio of fiber-forming resin to carrier resin is from about 1:100 to about 10:1. The fiber forming resin is typically a sulfonated thermoplastic, and in particular, a sulfonated tetrafluoroethylene based fluoropolymer-copolymer. In a refinement, the fiber-forming resin has a weight average molecular weight from about $0.2\times10^5$ to $5\times10^6$ Daltons. In a further refinement, the fiber-forming resin has 0.5 to 1.5 meq/g sulfonyl groups (i.e., sulfonic acid groups plus sulfonyl fluoride groups). Characteristically, the fiber-forming resin is described by formulae I, II or III:

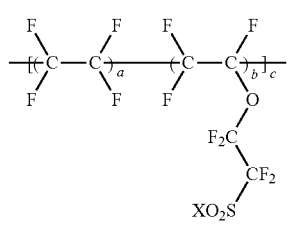

I

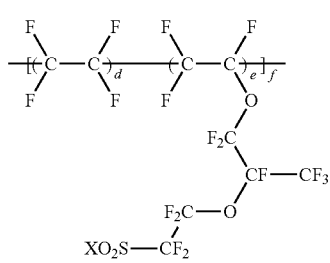

II

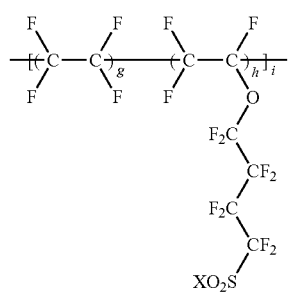

III wherein:
a is about 5 or 6;
b is 1;
c is on average from about 30 to 150;
d is about 5;
e is 1;
f is on average from about 30 to 150;
g is about 5;
h is 1;
i is on average from about 30 to 150; and
X is OH or F.

In a refinement, X is F which can be subsequently hydrolyzed to $SO_3H$. In step b), the resinous mixture 74 is extruded at elevated temperatures (e.g., 180 to 250° C.) using extruder 76 to form an extruded resinous mixture 78 in which the extruded resinous mixture has fiber strands of the fiber-forming resin 70 within the carrier resin 72. In step c), the extruded resinous mixture 78 is separated from the extruder. In step d), extruded resinous mixture is contacted with water to separate the fiber strands of the fiber-forming resin 70 from the carrier resin 72. In a refinement, the thus formed fiber strands of the fiber-forming resin have an average diameter from about 5 nanometers to about 10 microns. In a refinement, the thus formed fiber strands of the fiber-forming resin have an average width from about 50 nanometers to about 100 nanometers.

Still referring to FIG. 4, the fiber strands of fiber-forming resin 70 are formed into fibrous sheet 80 in step e). In one variation, fibrous sheet 80 is used as or incorporated into the polymeric ion conducting membrane 12 of FIG. 1. In another variation, fibrous sheet 80 is used as or incorporated into the polymeric membrane 46 of FIG. 3.

In a particularly useful refinement, the fiber-forming resin-is described by formula VI, with 1.15 millimoles of $SO_2F$ per gram, and 1 millimole of $SO_2F$ groups per gram, respectively, available from Sigma-Aldrich:

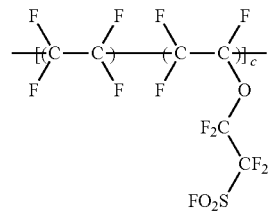

VI

In another refinement, the fiber-forming is described by formula-VII, with 0.9 and 1 millimole of $SO_2F$ per gram, available as NAFION® R1100 and R1000, respectively, from Ion Power:

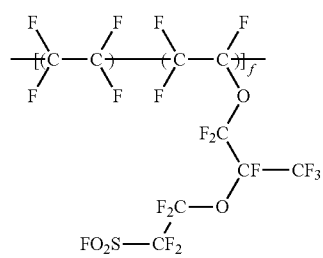

VII

The fiber-forming resin can be formed from a number of ethylenically unsaturated resins. For example, the fiber-forming resin is formed by reacting a monomer having formula IVa and/or IVb with a monomer having formula V:

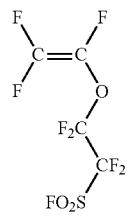

IVa

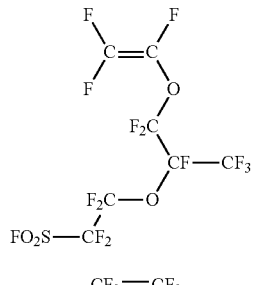

IVb

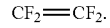

V

Figure 5:
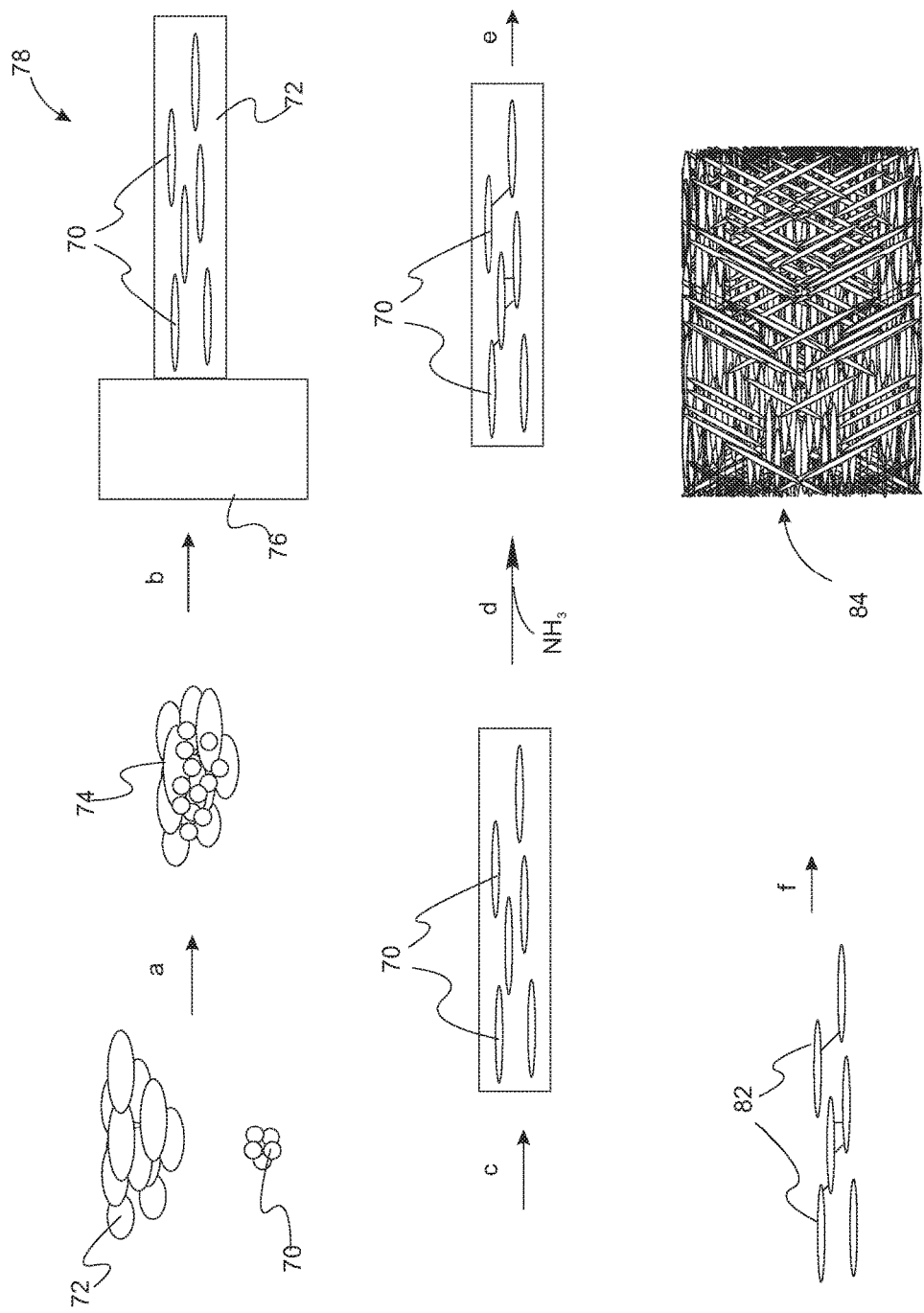
FIG. 5 is a schematic flow chart showing a method of making sulfonated thermoplastic polymer fibers.

With reference to FIG. 5, a method for making sulfonated fibers for fuel cell applications is provided. In step a), a fiber-forming resin 70 is combined with a water soluble carrier resin 72 to form a resinous mixture. In a variation, the carrier resin is a water soluble polyamide such as poly(2-ethyl-2-oxazoline). In a refinement, the carrier resin has a weight average molecular weight from about 4,000 to 6000 Daltons. In a further refinement, the carrier resin has a weight average molecular weight from 5,000 or 50,000 or 200,000 or 500,000 Daltons. In a refinement, the weight ratio of fiber-forming resin to carrier resin is from about 1:100 to about 10:1. The fiber forming resin is typically a sulfonated thermoplastic, and in particular, a sulfonated tetrafluoroethylene based fluoropolymer-copolymer. In a refinement, the fiber-forming resin has a weight average molecular weight from about $0.2 \times 10^5$ to $5 \times 10^6$ Daltons. In a further refinement, the fiber-forming resin has a 0.5 to 1.5 meq/g sulfonyl groups (i.e., sulfonic acid groups plus sulfonyl fluoride groups). Characteristically, the fiber-forming resin is described by formulae I, II or III.

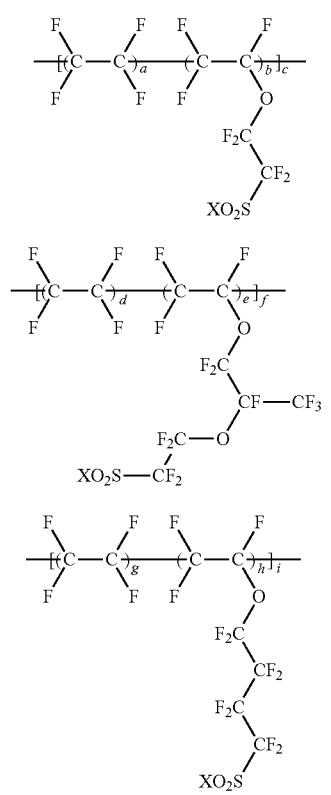

wherein:
a is about 5 or 6;
b is 1;
c is on average from about 30 to 150;
d is about 5;
e is 1;
f is on average from about 30 to 150;
g is about 5;
h is 1;
i is on average from about 30 to 150; and
X is OH or F.

In step b), the resinous mixture 74 is extruded at elevated temperatures (e.g., 180 to 250° C.) using extruder 76 to form an extruded resinous mixture 78 in which the extruded resinous mixture has fiber strands of the fiber-forming resin 70 within the carrier resin 72. In step c), the extruded resinous mixture 78 is separated from the extruder. In step d), the extruded resinous mixture is contacted with ammonia to form an ammonia-treated fiber-formed resin. In a refinement, the ammonia is in the gaseous state. In another refinement, the ammonia is added in an amount of 0.1 to 6 molar excess equivalents with respect to the fiber-forming resin. In still another refinement, the ammonia is added in an amount of 1.5 to 6 molar excess equivalents with respect to the fiber-forming resin. In step e), the ammonia-treated fiber-formed resin is contacted with water to separate the fiber strands of the fiber-forming resin 70 from the carrier resin to form fiber strands of a sulfonimide crosslinked perfluorosulfonic acid polymer 82 in which at least a portion of the $SO_2F$ being hydrolyzed to $SO_3H$. In this embodiment, the details regarding the fiber-forming resins and the monomers from which the resins are formed are the same as set forth above.

Still referring to FIG. 5, the fiber strands of resin 82 are formed into fibrous sheet 84 in step f). In one variation, fibrous sheet 84 is used as or incorporated into the polymeric ion conducting membrane 12 of FIG. 1. In another variation, fibrous sheet 84 is used as or incorporated into the polymeric membrane 46 of FIG. 3.

Still referring to FIG. 5, in a variation, the fiber forming resin is described by formula VI and the ammonia-treated fiber-formed resin is described by formula X:

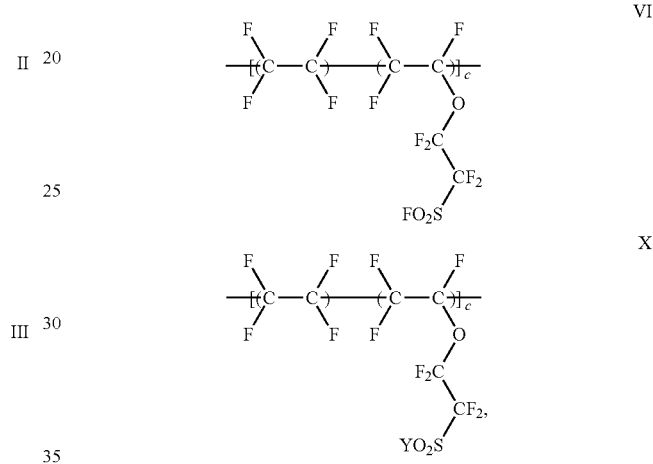

wherein Y is F, OH, $NH_2$, or NH.

In another variation, the fiber-forming resin is described by formula VII and the ammonia-treated fiber-formed resin is described by formula XI:

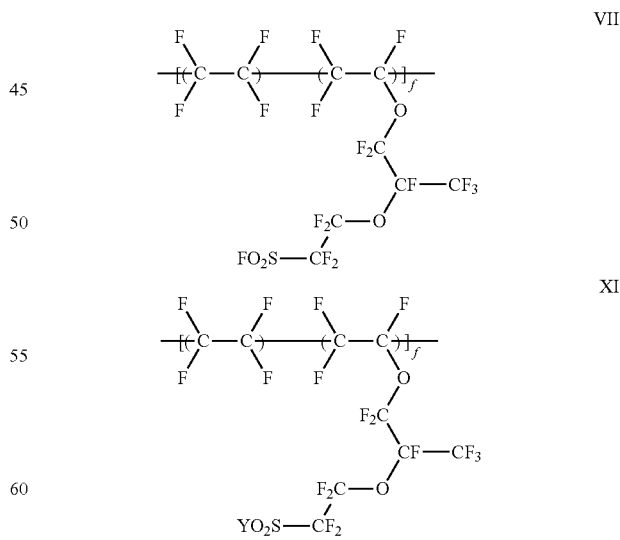

wherein Y is F, OH, $NH_2$, or NH.

Figure 6:
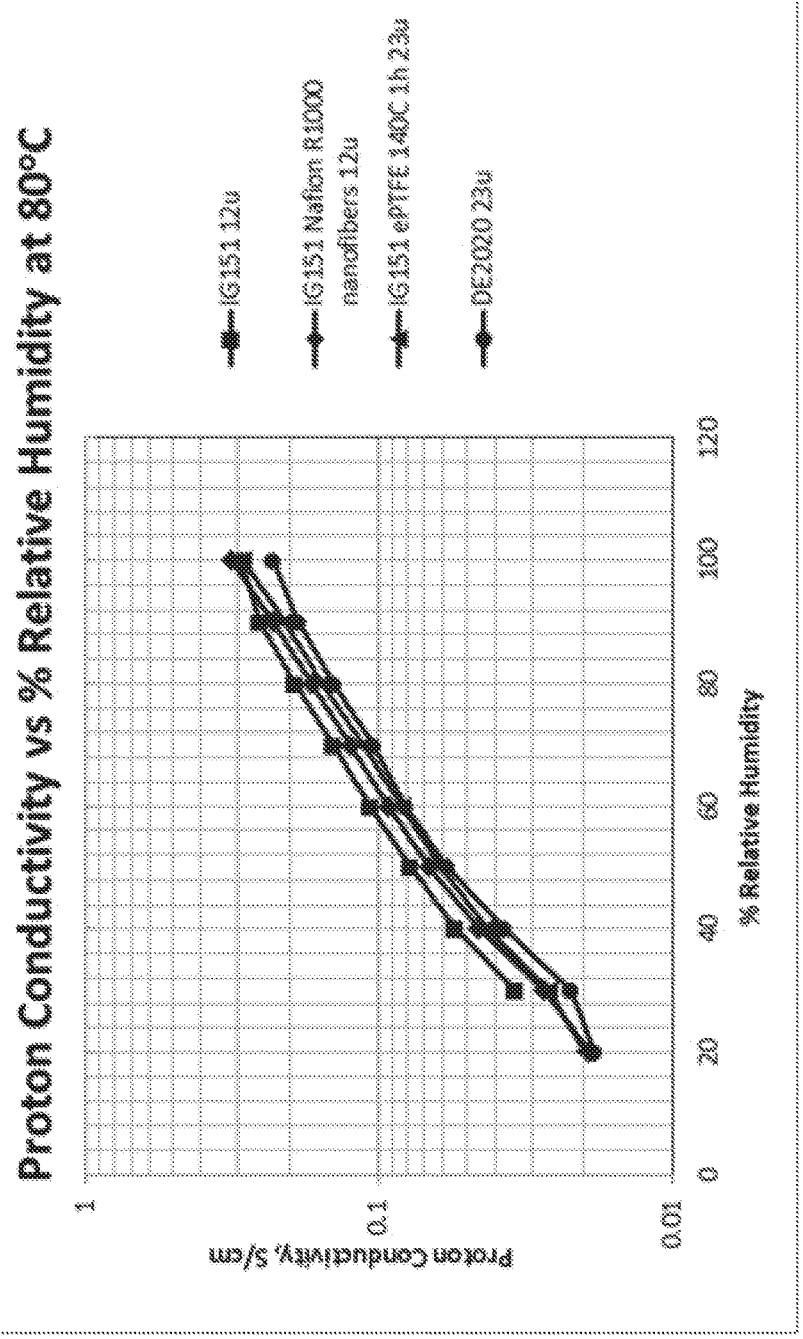
FIG. 6 is a plot of proton conductivity in S/cm versus percent relative humidity at 80° C. for a fuel cell membrane containing 10 weight percent nanofiber additive prepared according to the instant invention.

With reference to FIG. 6, the proton conductivity in S/cm at 80° C. versus percent relative humidity of various membranes are compared. IG151 is an ionomer with the structure 4 with an ion exchange capacity of 1.24 mmoles H+ per gram available from Asahi Glass. This membrane is compared to that of IG151 with 10 weight percent of strands of ammonia crosslinked nanofibers added as described herein, and to that of IG151-membrane reinforced with Donaldson Tetratex 1326 expanded tetrafluoroethylene, and to that of a membrane made of NAFION® 1000 (DE2020, DuPont deNemours). The membrane conductivity decreased in the order: IG151 (alone) >IG151 with the NAFION® 1000 nanofibers >IG151 with the ePTFE >NAFION® DE2020 (NAFION® 1000 PFSA IX, with 1 millimole $SO_3H$ per gram, alone).

The following examples illustrate the various embodiments of the present invention. Those skilled in the art will recognize many variations that are within the spirit of the present invention and scope of the claims.

Figure 7A:
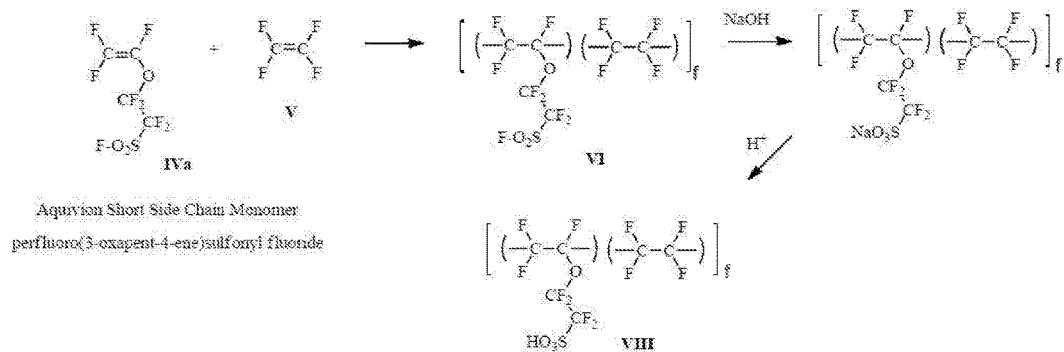
FIGS. 7A and 7B provides reaction scheme followed to make PFSF copolymers VI and VII and PFSA Ionomers VIII and IX.
Figure 7B:
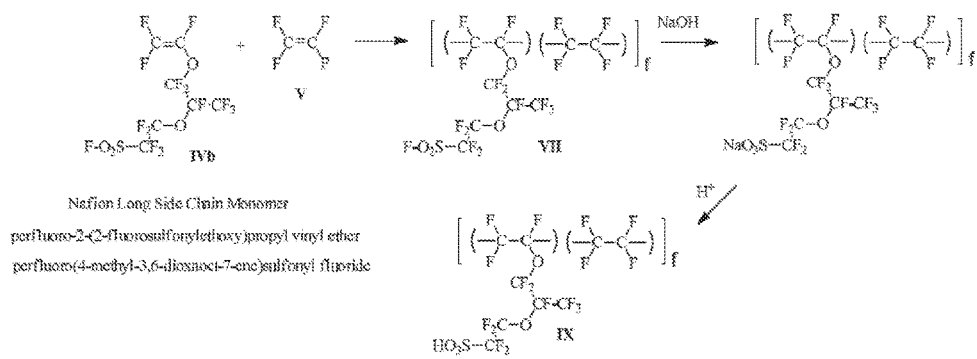

The PFSA nanofibers produced by extrusion are useful in fuel cells, humidifiers, electrolyzers, electrodes, ion exchange applications, battery separators, and filters. PFSA nanofibers of ionomers VIII and IX are made from the nanofiber sulfonyl fluoride copolymers PFSF VI and VII as shown in FIGS. 7A and 7B. With reference to FIGS. 7A and 7B, reaction schemes are provided that show how PFSF copolymers VI and VII and PFSA ionomers VIII and IX are made.

Two generic forms of PFSA ionomers include the Aquivion® short side chain ionomer VIII and the NAFION® long side chain ionomer IX. The Aquivion® short side chain monomer IVa is polymerized with tetrafluoroethylene V to form the sulfonyl fluoride copolymer, PFSF VI, which is then sequentially treated with base to form the sodium salt and then with acid to make the PFSA ionomer VIII.

The NAFION® PFSA ionomer IX is made by first polymerizing the NAFION® long side chain monomer IVb with tetrafluoroethylene V to make the PFSF copolymer VII. PFSF VII is then hydrolyzed in alkaline media to the sulfonic acid salt, and then acidified to the sulfonic acid, IX.

Nanofibers of two different PFSA ionomers were prepared that include the Aquivion® short side chain, PFSA ionomer VIII (Solvay-Solexis) and the NAFION® long side chain PFSA ionomer IX (DuPont de Nemours). These nanofibers are formed by alkaline hydrolysis and then acidification of nanofibers made from commercially available, sulfonyl fluoride copolymers, PFSF VI and VII. Short side chain copolymers with the structure VI include Aquivion P875—$SO_2F$ (1.15 millimole of $SO_2F$ per gram) and 98-$SO_2F$ (1 millimole of $SO_2F$ per gram), available in pellet form from Sigma-Aldrich. Long side chain copolymers with the structure VII include NAFION® R1000 (1 millimole of $SO_2F$ per gram) and NAFION® R1100 (0.9 mmol of $SO_2F$ per gram). Both are available in pellet form from Ion Power.

The nanofibers are prepared by extruding the water-insoluble, thermoplastic pellets of PFSF VI and VII with water soluble, poly(2-ethyl-2-oxazoline), PEOX (a polyamide with a glass transition temperature of about 70° C.).

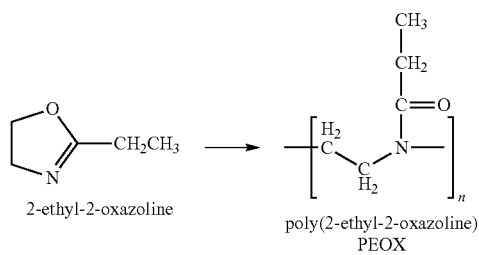

2-ethyl-2-oxazoline → poly(2-ethyl-2-oxazoline) PEOX

PEOX is commercially available in several molecular weight grades (5,000-500,000): 5,000, 50,000, 200,000, and 500,000 Daltons. In an extrusion process, the melt viscosity of polymers (such as PFSF and PEOX) usually increases with increased molecular weight and decreases with increased temperature (200° C. to 250° C.). Likewise, the width of the nanofibers formed is dependent on extrusion temperature and the melt viscosity of the two incompatible polymers. Higher PEOX molecular weight grades and higher extrusion temperatures favor the formation of smaller diameter nanofibers. During extrusion, the polymer (PFSF VI and VII) added to PEOX separates into discrete nanofiber domains within the PEOX matrix. The free-standing PFSF nanofibers are obtained when the PEOX is dissolved away. The formation of nanofibers by this extrusion method based on polymer incompatibility and differential solubility is described for other polymers in U.S. Patent Appl. No. 20120102725; 20130320583 (polyethylene); 20130330653; 20130330655; and 20140045094 (polyphenylene sulfide); and U.S. Pat. No. 8,833,434 (polyphenylene sulfide) and U.S. Pat. No. 9,163,337 (polyperfluorocyclobutanes); the entire disclosures of which are hereby incorporated by reference. Perfluorosulfonic acid nanofibers are not obtained directly by extrusion of PFSA ionomers VIII and IX with poly(2-ethyl-2-oxazoline) (PEOX), because the PEOX and PFSA are compatible polymers and have similar solubility in like solvents when mixed together. Instead, the thermoplastic, sulfonyl fluoride precursors PFSF copolymers VI and VII are extruded with PEOX (200,000 Daltons) at 200° C. to form PFSF nanofibers VI and VII ($SO_2$—F form), which are then converted to the PFSA nanofibers VIII and IX.

EXAMPLES

Failed Attempt to Make Perfluorosulfonic Acid Nanofibers by Extrusion of Perfluorosulfonic Acid Lonomer (NAFION® 1000-Equivalent Weight) IX with Poly(2-Ethyl-2-Oxazoline).

NAFION DE2020® (DuPont de Nemours) is a 1000 equivalent weight perfluorosulfonic acid ionomer IX (with 1 millimole $SO_3H/g$) as a solution in 60/40 propanol-water. NAFION DE2020® (75 mL, $SO_3H$ form) is placed in Spectra/Por® dialysis tubing (12,000-14,000 MWCO, 1.14-inch diameter) and dialyzed against water in a 4-liter beaker with frequent water changes to disperse the ionomer completely in water and exchange out the 1-propanol component of the 60/40 propanol water solvent. The aqueous ionomer solution is frozen in a dry ice-isopropanol bath and then lyophilized (freeze-dried) under vacuum (0.3 mm Hg) to form a white ionomer foam. The ionomer is mixed with a 200,000-molecular weight (Dalton) water soluble polymer poly(2-ethyl-2-oxazoline) (Alfa, PEOX). Specifically, 5 grams of the ionomer is first blended in a Waring blender with 15 grams of 200,000 Dalton PEOX (a ratio of 1 to 3). The combined blend is added to a laboratory mixing extruder (Dynisco, LME) operated at 200 degree C.-header and -rotor temperatures with the drive motor operated at 50% of capacity, resulting in an extruded strand of the blend. The resulting extruded strand is added to water (400 mL) using a Waring blender, until the PEOX dissolves. When the aqueous dispersion is filtered, no perfluorosulfonic acid fibers are formed or collected on polytetrafluoroethylene filters (Millipore Mitex) with either a 0.1 or 5 micron pore size). The perfluorosulfonic acid ionomer apparently dissolves in the aqueous mixture.

Preparation of NAFION R1000® Poly[Perfluoro-2-(2-Fluorosulfonylethoxy)Propyl Vinyl Ether-Tetrafluoroethylene] (PFSF VII) Nanofibers Prepared by Extrusion.

NAFION R1000® (Ion Power) is a commercial, thermoplastic polymer with 1 meq/g sulfonyl fluoride groups available as 3-mm extruded pellets. NAFION R1000® (5 grams, PFSF VII) is mixed with a 200,000-molecular weight (Dalton), water soluble polymer, poly(2-ethyl-2-oxazoline) (PEOX, 15 g, Alfa). The combined blend is then added to a laboratory mixing extruder (Dynisco, LME) operated at 200 degree C. for both header and rotor temperatures with the drive motor operated at 50% of capacity, resulting in an extruded strand of the blend. This extruded strand is added to a blender to return it to granular form, and is then re-extruded two more times, creating a uniform extruded strand. During the final extrusion process, the fibers are spun onto a take-up wheel (a Dynisco Take-Up System, TUS), at approximately 10 cm/second. The resulting extruded strand is added to water (400 mL) using a Waring blender, until the PEOX dissolves. When the aqueous dispersion is filtered, nanofibers of NAFION R1000® (in the sulfonyl fluoride form) are collected as a sediment after centrifugation, rewashed with isopropanol and then filtered and dried. The nanofibers of NAFION R1000® can also be isolated from the extruded strand by dissolving the PEOX in either tetrahydrofuran (400 mL) or methylene chloride (400 mL) followed by centrifugation and filtration. Tetrahydrofuran and methylene chloride dissolve PEOX but not PFSF VII. The resulting nanofibers are repeatedly washed in tetrahydrofuran or methylene chloride using a Waring blender, until the PEOX has been removed, resulting in NAFION R1000® (sulfonyl fluoride form) nanofibers as PFSF VII, which then are collected on a polytetrafluoroethylene filter and dried. Typically, the nanofibers are less than approximately 0.5 microns wide and are more than 10 microns long. Nanofibers of NAFION R1000® (in the sulfonyl fluoride form) with even smaller dimensions are obtained by using 500,000-Dalton PEOX instead of 200,000-Dalton PEOX, and by increasing the extrusion temperature of the blend to 220 degrees C. The nanofibers are then treated sequentially with base (aqueous NaOH) and then acid (aqueous HCl) to hydrolyze the sulfonyl fluoride groups to sulfonic acid groups, as described below.

Preparation of Nanofibers of Poly[Perfluoro(4-Methyl-3,6-Dioxaoct-7-Ene)Sulfonic Acid-Tetrafluoroethylene].

NAFION R1000® (5 grams, sulfonyl fluoride form) is mixed with a 200,000-molecular weight (Dalton), water soluble polymer poly(2-ethyl-2-oxazoline) (PEOX, 15 g, Alfa). The combined blend is then added to a laboratory mixing extruder (Dynisco, LME) operated at 200 degree C. header and rotor temperatures with the drive motor operated at 50% of capacity, resulting in an extruded strand of the blend. This extruded strand is added to a blender to return it to granular form, and is then re-extruded two more times, creating a uniform extruded strand. During the final extrusion process, the fibers are spun onto a take-up wheel (a Dynisco Take-Up System, TUS), at approximately 10 cm/second The resulting extruded strand is added to water (400 mL) using a Waring blender, until the PEOX dissolves. NAFION R1000® nanofibers (in the sulfonyl fluoride form) are collected as a sediment after centrifugation, and then are repeatedly washed in water using a Waring blender followed by centrifugation until the PEOX is removed. After centrifugation, the sediment consisting of NAFION R1000® nanofibers (in the sulfonyl fluoride form) is stirred with 25 wt. % sodium hydroxide (200 mL) for 16 hours, and then is centrifuged. The sediment is repeatedly washed with water and centrifuged to remove the NaOH. The nanofiber sediment is then stirred with 18 wt. % hydrochloric acid in water (200 mL) for 16 hours. The nanofibers are collected as a sediment after centrifugation. The nanofiber sediment is purified by extensive washings and centrifugations with deionized water, and then is collected by filtration and dried. Typically, the nanofibers are approximately 0.5 to 1 micron wide and more than 10 micron long, and are in the perfluorosulfonic acid ionomer form.

Preparation of Gas Filters with Perfluorosulfonic Acid (PFSA) Nanofibers.

A polyethylene drying tube with polypropylene tube fittings (Bel-Art SP Scienceware, 7.39-in long, 16-mm inner diameter, and 19-mm outer diameter available from Fisher Scientific) is packed with a plug consisting of a small wad of glass wool, then a long bed of perfluorosulfonic acid nanofibers, and then another plug consisting of a small wad of glass wool. Cotton wads can also be used instead of the glass wool. This tube serves as a filter to remove ammonia and cationic impurities from ambient air streams fed to flat sheet PFSA, water vapor transfer (WVT) humidifiers that humidify gases to fuel cells. Flat sheet WVT humidifiers made with PFSA ionomers are easily poisoned by cationic and amine impurities, which are effectively removed by these PFSA nanofiber gas filters.

Perfluorosulfonic Acid Nanofiber Additives to Perfluorosulfonic Acid Fuel Cell Membranes.

NAFION 1000R® (sulfonyl fluoride form, 5 g) was co-extruded with polyethyl-2-oxazoline (200,000 Daltons, 15 g) at 200° C. and the plastic extruded strand was pulled to a thin fiber. The extruded fiber (5 g, 1.7 mmol $SO_2$—F) was then treated with a small amount of ammonia gas (0.13 g, 7.2 mmol, 3.8 molar excess equivalents of $NH_3$) in a 1-L beverage bottle for 3 days to form small amounts of sulfonamide and some sulfonimide groups. Treatment with water in a Waring blender produced 100-500 nm diameter nanofiber strands that were treated with aqueous sodium hydroxide and then aqueous hydrochloric acid to form sulfonimide crosslinked perfluorosulfonic acid ionomer PFSA IX nanofibers. These PFSA IX nanofibers are suited to the formation of filter mats to filter gas streams for water vapor transfer humidifiers, for proton conducting supports to replace expanded polytetrafluoroethylene (ePTFE) supports in polyelectrolyte membranes, and for proton conducting supports for electrodes in fuel cells. In this example, nanofibers are used as proton conducting supports for membranes in fuel cells. To Asahi Glass ionomer solution IG151 (1.2 millimoles $SO_3H$ per gram) at 20 wt. % solids in 60/40 ethanol-water is added 10 wt. % solids of the PFSA nanofibers which are dispersed with a Waring blender. After standing to remove air bubbles, the mixture is coated with a 3-mil Bird applicator onto a 1-mil, fluoroethylene polymer-Kapton®-fluoroethylene polymer laminate (Part #120FN616, available from American Durafilm) secured on a vacuum platen using an Erichsen coater operated at 12.5 mm/sec. After heating from 23 to 80° C. on the platen, the coated film is transferred to an oven and heated from 80° C. to 140° C., and maintained at 140° C. for 1 hour. The 12-micron thick membrane is removed from the backer film and the proton conductivity versus percent relative humidity is measured and compared to an IG151 membrane made similarly without the nanofiber additive and to one made with IG151 with expanded tetrafluoroethylene (Donaldson, Tetratex 1326). The results are shown graphically in FIG. 6. The proton conductivity at 80° C. versus percent relative humidity of the membranes decreased in the order: IG151 (alone) >IG151 with the NAFION 1000 nanofibers >IG151 with the ePTFE >NAFION® DE2020 (DuPont deNemours, NAFION 1000 PFSA IX, alone). The mat of PFSA nanofibers is proton conducting whereas the ePTFE support is not.

Perfluorosulfonyl Fluoride Nanofibers Partly Treated with Ammonia.

NAFION 1000R (sulfonyl fluoride form) is co-extruded with polyethyl-2-oxazoline at 200° C. and the plastic extruded strand is pulled to a thin fiber. The thin fiber is then treated with excess ammonia gas to form between 40 and 50% conversion of the sulfonyl fluoride groups to sulfonamide groups as determined by FTIR spectroscopy. Treatment with water in a Waring blender produced 100-500 nm diameter strands in which the remaining sulfonyl fluoride groups are converted to perfluorosulfonic acid groups, after acid treatment. These nanofiber strands are insoluble in any solvents tried, presumably due to sulfonimide crosslinking during the aminolysis reaction. They are suited to the formation of filter mats and for proton conducting supports to replace ePTFE in polyelectrolyte membranes in fuel cells. These nanofibers are also used as proton conducting additives in supports for membranes, water vapor transfer membranes, and electrodes in fuel cells. Lesser amounts of sulfonamide and sulfonimide crosslinking results when less ammonia is used to treat the PEOX-PFSF strands. PFSF VII nanofibers treated with ammonia to form partly substituted sulfonamide groups are compression molded at 200° C. and between 0 and 500 psi to form PFSF VII films having sulfonimide cross-links. These nanofibers were then treated with base and then acid to form proton exchange membrane films with sulfonic acid and sulfonimide crosslinking groups.

Perfluorosulfonyl Fluoride Nanofibers Fully Treated with Ammonia.

NAFION 1000R (sulfonyl fluoride form) was co-extruded with polyethyl-2-oxazoline at 200° C. and the plastic extruded strand is pulled to a thin fiber. The thin fiber is then chopped and dispersed in tetrahydrofuran or methylene chloride using a Waring blender until all the PEOX dissolves. The mixture is centrifuged and the sediment consisting of nanofibers of PFSF VII is then added to excess ammonia liquid maintained in a flask using a dry ice condenser. Ammonia evaporates, and the sulfonyl fluoride groups are converted to sulfonamide groups. The insolubility of the nanofibers in all solvents tried suggests some sulfonimide groups also form. Treatment with water in a Waring blender produces a dispersion of 100-500 nm diameter strands, which is then treated with base and then acid. The nanofibers are centrifuged and filtered onto a polypropylene filter cloth (Sefar). The nanofibers are insoluble in any of the solvents tried, presumably due to some sulfonimide crosslinking during the aminolysis reaction. These sulfonamide nanofibers are allowed to react with perfluoroalkylsulfonyl fluorides (such as perfluorobutanesulfonyl fluoride) with acetonitrile and 2 equivalents of N,N-diisopropylethylamine in a Parr pressure reactor to make other diverse sulfonimide nanofibers.

Platinum Black Deposited on Perfluorosulfonic Acid Nanofibers.

A catalytic layer is added to the PFSA nanofibers. In the following example, platinum salt is reduced to metallic platinum on the surface of the PFSA nanofibers. PFSA nanofibers (1 g), previously modified with 0.1 N NaOH (100 mL), are treated with diaminedinitroplatinum(II) as a 3.4 wt. % solution in dilute ammonium hydroxide [Aldrich, 47.4 mL solution, 48.42 g solution, 1.646 g diaminedinitroplatinum(II), 0.005126 mol diaminedinitroplatinum(II)]. To this mixture is added 100 mL of 15 wt. % sodium borohydride (Aldrich) in 0.1 N NaOH. After heating at 60° C. for 4 hours with stirring, the mixture is allowed to stir for 16 h at 23° C. The black nanofibers are isolated by filtration, washed with 1 N HCl, washed with isopropanol, and then air-dried. These metallized nanofibers are useful as fuel cell catalysts and electron conducting media in fuel cells.

Perfluorosulfonic Acid Nanofibers with Carbon Black.

NAFION® 1000R (sulfonyl fluoride form) with between 5 and 30 wt. % carbon black (Vulcan XC72, Cabot Corp.), prepared by melt mixing, is co-extruded with poly(2-ethyl-2-oxazoline) at 200° C. and the plastic extruded strand is pulled to a thin fiber. The thin fiber is optionally treated with a small amount of ammonia gas to form 10% conversion of the sulfonyl fluoride groups to sulfonamide and sulfonimide groups as determined by FTIR spectroscopy. Treatment with water in a Waring blender produces 100-500 nm diameter strands in which the remaining sulfonyl fluoride groups are converted to perfluorosulfonic acid groups. The black strands formed, which are collected by filtration and then air-dried, are proton conductive and also electrically conductive when the carbon black loading is about 14 wt. % of the fiber or greater.

Perfluorosulfonic Acid Nanofibers with Platinum on Carbon Catalyst.

NAFION 1000R (sulfonyl fluoride form) is melt mixed with platinum on high surface area carbon or graphitized carbon (TKK) by melt mixing and then the mixture is co-extruded with poly(2-ethyl-2-oxazoline) at 200° C. The plastic extruded strand is pulled to a thin fiber. The thin fiber is optionally treated with a small amount of ammonia gas to form 10% conversion of the sulfonyl fluoride groups to sulfonamide and sulfonimide groups as determined by FTIR spectroscopy. Treatment with water in a Waring blender produces 100 to 500 nm diameter strands of perfluorosulfonic acid nanofibers with platinum on carbon catalyst suitable as a fuel cell catalyst.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:
1. A method of making a device with a fibrous sheet, the method comprising:
   a) combining a fiber-forming resin with a carrier resin to form a resinous mixture, the carrier resin being water soluble and the fiber-forming resin having formulae I, II or III:

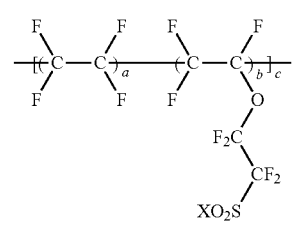

-continued

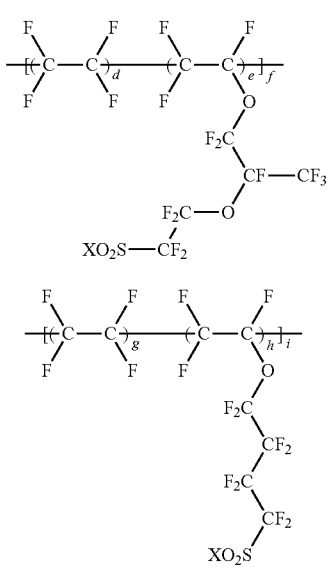

wherein:
- a is about 5 or 6;
- b is 1;
- c is on average from about 30 to 150;
- d is about 5;
- e is 1;
- f is on average from about 30 to 150;
- g is about 5;
- h is 1;
- i is on average from about 30 to 150; and
- X is OH or F;

b) extruding the resinous mixture to form an extruded resinous mixture, the extruded resinous mixture having fiber strands of the fiber-forming resin within the carrier resin;

c) grinding the extruded resinous mixture and then re-extruding to reform the re-extruded resinous mixture; and d) contacting the re-extruded resinous mixture with water to separate the fiber strands of the fiber-forming resin from the carrier resin.

2. The method of claim 1 wherein fiber-forming resin is formed by reacting a monomer having formula IVa and/or IVb with a monomer having formula V:

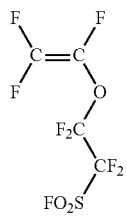

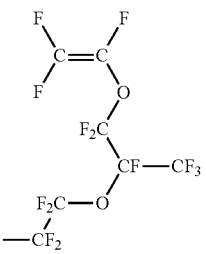

$CF_2 = CF_2$.

3. The method of claim 1 wherein X is F.

4. The method of claim 3 wherein the $SO_2F$ is hydrolyzed to $SO_3H$.

5. The method of claim 1 wherein X is OH.

6. The method of claim 1 further comprising forming the fiber strands of the fiber-forming resin into a fibrous sheet.

7. The method of claim 1 wherein the carrier resin is a water soluble polyamide.

8. The method of claim 1 wherein the carrier resin comprises poly(2-ethyl-2-oxazoline) or poly(phenyl-2-oxazoline).

9. The method of claim 1 wherein the weight ratio of fiber-forming resin to carrier resin is from about 1:100 to about 10:1.

10. The method of claim 1 wherein the fiber strands of the fiber-forming resin have an average width from about 50 nanometers to about 100 nanometers.

* * * * *